(12) United States Patent
Spisany et al.

(10) Patent No.: US 7,488,205 B2
(45) Date of Patent: Feb. 10, 2009

(54) FIXED ANGLED PATCH PANEL

(75) Inventors: Gordon C. Spisany, Plano, TX (US); Stanley E. Wright, McKinney, TX (US); Brian Fitzpatrick, McKinney, TX (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/637,732

(22) Filed: Dec. 13, 2006

(65) Prior Publication Data

US 2008/0146079 A1   Jun. 19, 2008

(51) Int. Cl.
*H01R 13/60* (2006.01)

(52) U.S. Cl. .................................. 439/540.1; 385/135

(58) Field of Classification Search .............. 439/540.1, 439/676, 719; 385/135, 134, 55; 361/826
See application file for complete search history.

(56) References Cited

U.S. PATENT DOCUMENTS

| | | | |
|---|---|---|---|
| 2,143,768 A | 1/1939 | Eichwald |
| 2,427,349 A | 9/1947 | Boynton |
| 3,199,068 A | 8/1965 | Neenan |
| 3,611,264 A | 10/1971 | Ellis, Jr. |
| 4,536,052 A | 8/1985 | Baker et al. |
| 4,538,868 A | 9/1985 | Cruise et al. |
| 4,747,020 A | 5/1988 | Brickley et al. |
| 4,815,104 A | 3/1989 | Williams et al. |
| 4,824,196 A | 4/1989 | Bylander |
| 4,832,436 A | 5/1989 | Goto et al. |
| 4,995,688 A | 2/1991 | Anton et al. |
| 5,011,257 A | 4/1991 | Wettengel et al. |
| 5,127,082 A | 6/1992 | Below et al. |
| 5,129,842 A | 7/1992 | Morgan et al. |
| 5,178,554 A | 1/1993 | Siemon et al. |
| 5,204,929 A | 4/1993 | Machall et al. |
| 5,214,735 A * | 5/1993 | Henneberger et al. ....... 385/136 |
| 5,238,426 A | 8/1993 | Arnett |
| 5,299,956 A | 4/1994 | Brownell et al. |
| 5,302,140 A | 4/1994 | Arnett |
| 5,303,519 A | 4/1994 | Mustee et al. |
| 5,310,363 A | 5/1994 | Brownell et al. |
| 5,363,465 A | 11/1994 | Korkowski et al. |
| 5,370,541 A | 12/1994 | Bossard |
| 5,370,553 A | 12/1994 | Zimmerman |
| RE34,955 E | 5/1995 | Anton et al. |

(Continued)

FOREIGN PATENT DOCUMENTS

EP    0 736 937    10/1996

(Continued)

*Primary Examiner*—Renee Luebke
*Assistant Examiner*—Vanessa Girardi
(74) *Attorney, Agent, or Firm*—Muncy, Geissler, Olds & Lowe, PLLC

(57) ABSTRACT

A patch panel, of the type for mounting to a rack system in a network closet, includes a plurality of openings for receiving bezels. The bezels may be connected to the patch panel by a snap-lock arrangement. Each bezel includes one or more ports for receiving a jack unit. The ports open in an angled direction toward a lateral side of the bezel. A surface is formed to a lateral side of the port, which accommodates snap locking features of a jack unit and a removable label over the snap locking features.

24 Claims, 6 Drawing Sheets

U.S. PATENT DOCUMENTS

| | | | |
|---|---|---|---|
| 5,412,751 | A | 5/1995 | Siemon et al. |
| 5,530,954 | A | 6/1996 | Larson et al. |
| 5,575,665 | A | 11/1996 | Shramawick et al. |
| 5,575,668 | A | 11/1996 | Timmerman |
| 5,591,045 | A | 1/1997 | Pepe et al. |
| 5,639,261 | A | 6/1997 | Rutkowski et al. |
| 5,645,449 | A | 7/1997 | Sabo |
| 5,659,650 | A | 8/1997 | Arnett |
| 5,674,093 | A | 10/1997 | Vaden |
| 5,676,566 | A | 10/1997 | Carlson |
| 5,700,167 | A | 12/1997 | Pharney et al. |
| 5,734,776 | A | 3/1998 | Puetz |
| 5,735,714 | A | 4/1998 | Orlando et al. |
| 5,773,763 | A | 6/1998 | Stachulla |
| 5,788,087 | A | 8/1998 | Orlando |
| 5,836,786 | A | 11/1998 | Pepe |
| 5,892,870 | A | 4/1999 | Fingler et al. |
| 5,898,129 | A | 4/1999 | Ott et al. |
| 5,903,698 | A * | 5/1999 | Poremba et al. ............. 385/135 |
| 5,921,402 | A | 7/1999 | Magenheimer |
| 5,944,535 | A | 8/1999 | Bullivant et al. |
| 5,945,633 | A | 8/1999 | Ott et al. |
| 5,947,765 | A | 9/1999 | Carlson, Jr. et al. |
| 5,956,449 | A | 9/1999 | Otani et al. |
| 5,967,836 | A | 10/1999 | Bailey |
| 5,969,294 | A | 10/1999 | Eberle et al. |
| 5,975,962 | A | 11/1999 | Laukonis |
| 5,984,720 | A | 11/1999 | Milner et al. |
| 6,146,192 | A | 11/2000 | Cabalka et al. |
| 6,208,796 | B1 | 3/2001 | Williams Vigliaturo |
| 6,231,380 | B1 | 5/2001 | Cabalka et al. |
| 6,236,795 | B1 | 5/2001 | Rodgers |
| 6,242,698 | B1 | 6/2001 | Baker, III et al. |
| 6,468,112 | B1 | 10/2002 | Follingstad et al. |
| 6,497,578 | B1 | 12/2002 | Kwong et al. |
| 6,537,106 | B1 * | 3/2003 | Follingstad ................. 439/534 |
| 6,565,260 | B2 | 5/2003 | Belaidi et al. |
| 6,600,106 | B2 | 7/2003 | Standish et al. |
| 6,614,978 | B1 | 9/2003 | Caveney |
| 6,711,339 | B2 | 3/2004 | Puetz et al. |
| 6,736,670 | B2 * | 5/2004 | Clark et al. ............. 439/540.1 |
| 6,866,541 | B2 * | 3/2005 | Barker et al. ............. 453/540.1 |
| 6,916,199 | B2 | 7/2005 | Follingstad |
| 6,918,786 | B2 | 7/2005 | Barker et al. |
| 6,974,348 | B2 | 12/2005 | Bentley |
| 7,343,078 | B2 * | 3/2008 | Spisany et al. ............. 385/137 |
| 2003/0129871 | A1 | 7/2003 | Follingstad |
| 2005/0191901 | A1 | 9/2005 | Follingstad |
| 2006/0194470 | A1 * | 8/2006 | Caveney ................. 439/540.1 |

FOREIGN PATENT DOCUMENTS

| | | | |
|---|---|---|---|
| GB | 2420665 A | 5/2006 | |

* cited by examiner

FIXED ANGLED PATCH PANEL

BACKGROUND OF THE INVENTION

1. Field of the Invention

The present invention relates to communication connectors. More particularly, the present invention relates to a patch panel and bezel for holding a plurality of communication connectors.

2. Description of the Related Art

Communications cables, such as shielded and unshielded twisted pair cables, coaxial cables, and fiber optic cables, transmit data, voice, video and/or audio information in the telecommunications industry. A network equipment rack system is well-known in this industry for managing and organizing such cables as they are routed to and from various destinations.

The rack system is usually located in a network closet and includes a frame having mounting apertures located along vertical legs of the rack. A patch panel is mounted onto the rack system so as to generally define a patching side, where outlets receive patch cords from another device or another outlet of a patch panel, and a distribution side, where cables from service providers, network equipment and/or building wiring are connected to terminals of the outlets.

Generally, structures and features for cable management are provided on both sides of the rack system to support and route the cables, such as cable ties and guides. With fiber optic cable terminating on a patch panel, controlling the bend radius is important. Also, it is preferred to direct most all types of cables (e.g. fiber optic cables, twisted pair cables, coaxial cables) exiting a patch panel quickly toward the vertical legs of the rack system in order to conserve space in the network closet and to present an organized and orderly appearance to the cables.

One proposed improvement to a patch panel design is described in the assignee's pending U.S. application Ser. No. 11/477,706, filed Jun. 29, 2006, entitled "PATCH PANELS WITH COMMUNICATIONS CONNECTORS THAT ARE ROTATABLE ABOUT A VERTICAL AXIS," the contents of which are hereby incorporated by reference. Another proposed improvement to a patch panel design is described in U.S. Pat. No. 6,866,541 to Barker et al. This patent describes a patch panel with a shallow V-shape (rather than being flat or planar), such that the vertex of patch panel protrudes in front of the rack system to which it is mounted. Jacks mounted in the patch panel open in a direction normal to the patch panel surfaces so that they are oriented to face outwardly as well as forwardly. Consequently, the cables exiting the jacks are directed to the sides of the patch panel, toward the vertical legs of the rack system. One shortcoming of this V-shaped design is that the extension of the patch panel forwardly of the rack requires additional space in the network closet.

SUMMARY OF THE INVENTION

It is an object of the present invention to provide a patch panel, of the type for mounting to a rack system in a network closet, which includes a plurality of openings for receiving bezels. The bezels may be connected to the patch panel by a snap-lock arrangement. Each bezel includes one or more ports for receiving a jack unit. The ports open in an angled direction toward a lateral side of the bezel. A surface is formed to a lateral side of the port, which accommodates snap locking features of a jack unit and a removable label over the snap locking features.

These and other objects are accomplished by a combination comprising: a patch panel formed by a frame having a plurality of openings therein and opposed lateral ends for mounting the patch panel to a rack system; and a bezel mounted in one of said plurality of openings, said bezel including: first and second perimeter flange areas defining a general plane of said bezel; connection features to attach said bezel to said patch panel; and a plurality of ports, each port for receiving a jack unit, wherein each port opens in a direction which is set at a first non-zero angle relative to a normal line extending away from said general plane of said bezel.

These and other objects are also accomplished by a combination comprising: a bezel configured for mounting to a patch panel, said bezel including: first and second perimeter flange areas defining a general plane of said bezel; connection features to attach said bezel to a patch panel; and a plurality of ports, each port for receiving a jack unit, wherein each port opens in a direction which is set at a first non-zero angle relative to a normal line extending away from said general plane of said bezel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF A PREFERRED EMBODIMENT

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

This invention is directed to a patch panel for communications connectors, with a primary example of such being a communications outlet or jack. As used herein, the terms "forward", "forwardly", and "front" and derivatives thereof refer to the direction defined by a normal vector extending from the center of the patch panel toward the viewer in FIG. 1, at a right angle to a pane including the front face of the patch panel. Conversely, the terms "rearward", "rearwardly", and derivatives thereof refer to the direction directly opposite the forward direction. The terms "lateral," "laterally", and derivatives thereof refer to the two directions defined by a vector originating at the center of the patch panel and extending normal to the forward direction toward either of the flanges of the patch panel in FIG. 1.

Figure 1:
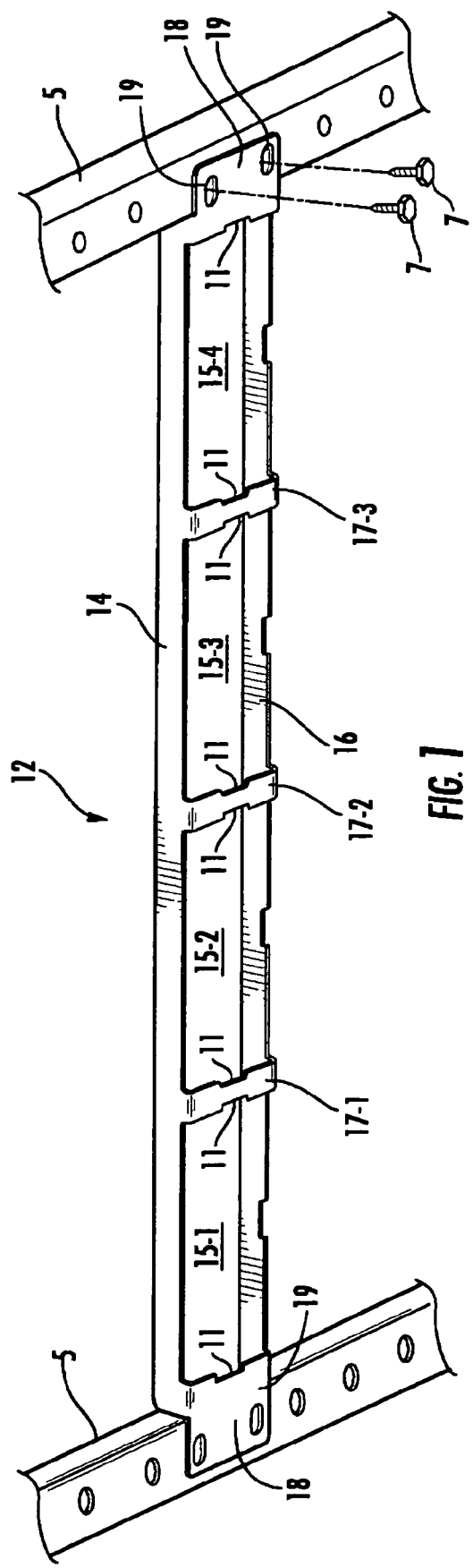
FIG. 1 is a perspective view of a patch panel 12, in accordance with the present invention.

FIG. 1 is perspective view of a patch panel 12, in accordance with the present invention. The patch panel 12 is essentially a skeletal frame and includes a top lip 14, a bottom lip 16 and lateral flanges 18 at each end. Two fastener holes 19 are formed in each lateral flange 18. The patch panel 12 is typically formed of steel or another metal, but could be formed of any suitable material, such as a plastic material. The patch panel 12 is designed to be mounted to vertical rails 5 of a rack system in a conventional manner, such as by inserting fasteners 7 through the fastener holes 19 in the flanges 18.

Three divider ribs 17-1 through 17-3 are spaced along the front of the patch panel 12 and connect the top lip 14 to the bottom lip 16. The divider ribs 17-1, 17-2, 17-3 in combination with the flanges 18 define a generally planar front face of the patch panel 12, which is located generally within a first plane. The divider ribs 17-1, 17-2, 17-3 in combination with the flanges 18 also define four openings 15-1, 15-2, 15-3, 15-4 into which bezels 70 can be mounted, as will be discussed hereinafter. Each side edge of a divider rib 17-1, 17-2, 17-3 bordering an opening 15 and each side edge of a flange 18 bordering an opening 15 includes a notch 11. The notch 11 cooperates with the mounting system of the bezel 70. Although three divider ribs 17-1, 17-2, 17-3 are illustrated, more or fewer divider ribs 17 may be included to define more or fewer openings 15 for bezels 70.

Figure 2:
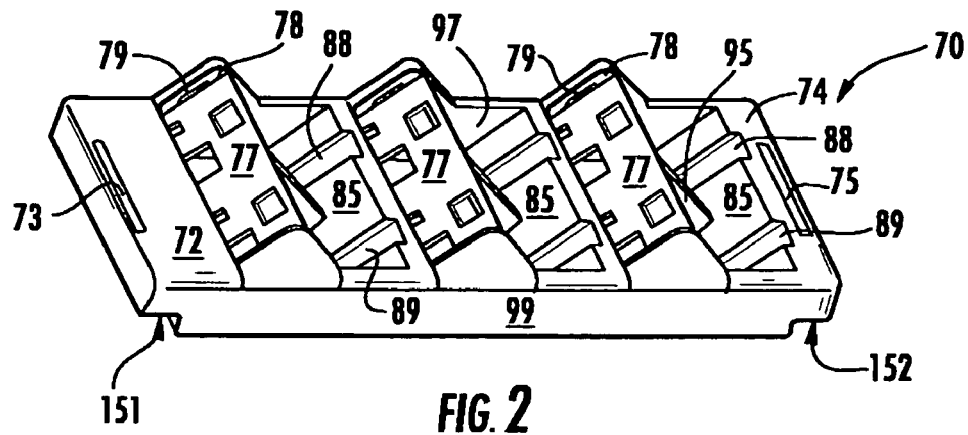
FIG. 2 is a perspective view of a bezel, in accordance with the present invention.
Figure 3:
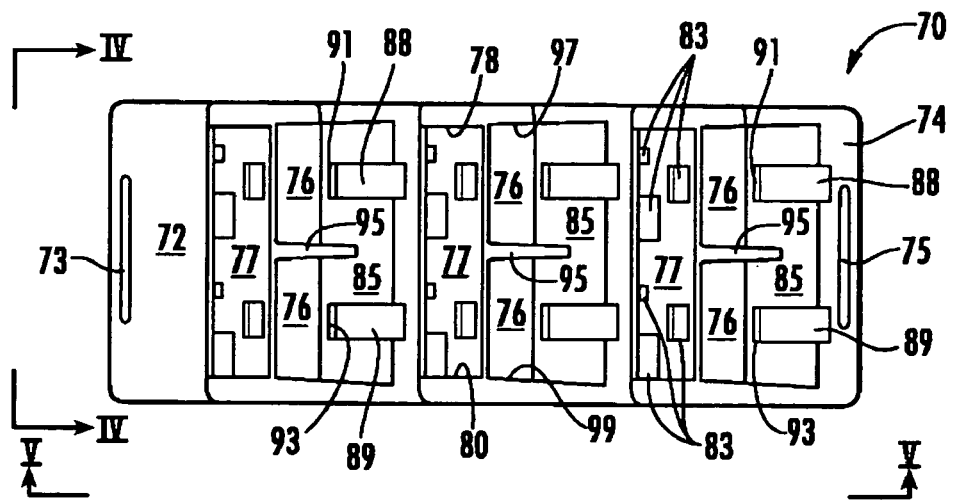
FIG. 3 is a front view of the bezel of FIG. 2.
Figure 4:
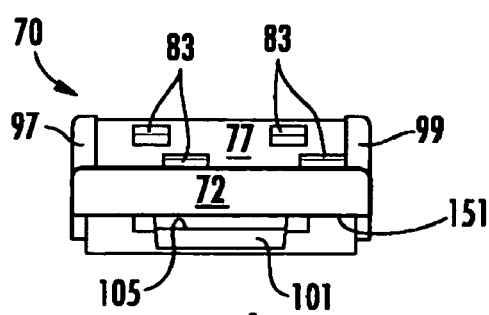
FIG. 4 is an end view of the bezel, taken along line IV-IV in FIG. 3.
Figure 5:
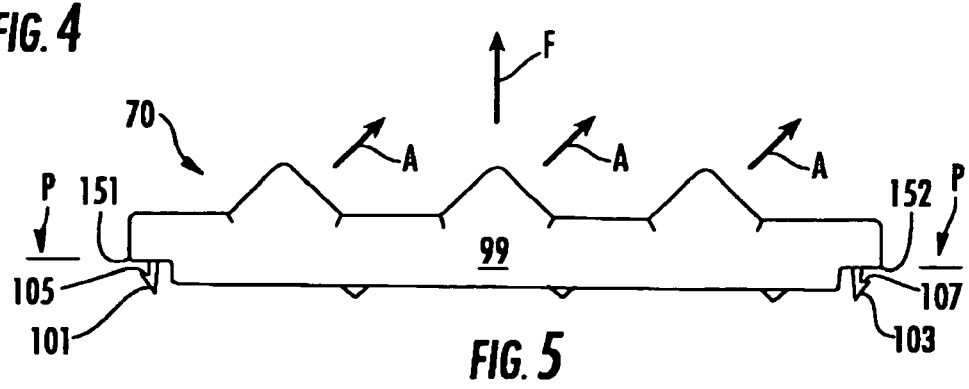
FIG. 5 is a top view of the bezel, taken along line V-V in FIG. 3.

FIGS. 2-5 illustrate one embodiment of the bezel 70, in accordance with the present invention. As illustrated in FIG. 2, the bezel 70 is bordered on its left by a generally flat first flange 72 having a first through slot 73 and is bordered on its right by a generally flat second flange 74 having a second through slot 75. Surfaces 151 and 152 of the first and second flanges 72, 74, respectively, which contact the patch panel 12, define a plane P of the bezel 70, which is generally parallel to the first plane of the patch panel 12, as best illustrated in FIG. 5. The front of the bezel presents a matrix of ports 76 which are angled to face to the right in the illustrations of FIGS. 2, 3 and 5, and more particularly in the direction of arrows A in FIG. 5.

The matrix is illustrated as having two rows and three columns of ports 76. However, more or fewer ports 76 could be included in the bezel 70, such as three rows and four columns. Also, the angles A are illustrated as being approximately 45 degrees relative to the forward direction F, which is also approximately 45 degrees relative to the general plane P of the bezel 70, as illustrated in FIG. 5. However, other angles would also be suitable, such as an angle selected in the range of 20 to 70 degrees, and more preferably in the range of 30 to 60 degrees relative to the forward direction F.

To the immediate left of each column of ports 76 exists a generally flat labeling surface 77 which defines a vertical sidewall for each port 76. A top shoulder 78 bordering the labeling surface 77 includes a third through slot 79. A bottom shoulder 80 bordering the labeling surface 77 also includes a fourth through slot 81 (see FIG. 6), in a mirror symmetrical manner to the third slot 79 in the top shoulder 78.

The third and fourth through slots 79, 81 cooperate with a label system 100 to removably attach the labeling system 100 above the labeling surface 77, in a manner to be described later in conjunction with FIG. 10. Each labeling surface 77 includes six rectangular through cuts 83. The through cuts 83 are provided to interact with resilient tabs and/or fixed tabs on the sidewalls of a jack unit, so as to permit the removable attachment of a jack unit within an port 76.

To the immediate right of each column of ports 76 exists a generally flat tool surface 85 which defines a vertical sidewall for each port 76. The tool surface 85 has first and second channels 88, 89 leading to first and second locking ridges 91, 93, respectively. The first and second locking ridges 91, 93 are provided to interact with resilient tabs and/or fixed tabs on the sidewalls of a jack unit, so as to permit the removable attachment of a jack unit within a port 76. The first and second channels 88, 89 provide access for a thin-bladed tool, like a flat-bladed screwdriver, to engage a tab abutting the first or second locking ridges 91 or 93, so that a resilient tab of the jack unit may be engaged thereto and moved to release a jack unit from the locking ridge 91 or 93.

A separation rib 95 connects an underside of the labeling surface 77 to the upper side of the tool surface 85 and defines a horizontal sidewall for each port 76. The remaining horizontal sidewall for each port 76 is defined by either a top wall 97 or a bottom wall 99.

As best seen in FIGS. 4 and 5, a first snap lock 101 resides below the first through slot 73 and a second snap lock 103 resides below the second through slot 75. The first snap lock 101 has a third locking ridge 105 for snapping past one of the notches 11 of the divider ribs 17 and/or flanges 18 of the patch panel 12. The second snap lock 103 has a fourth locking ridge 107 for snapping past one of the notches 11 of the divider ribs 17 and/or flanges 18 of the patch panel 12.

Figure 6:
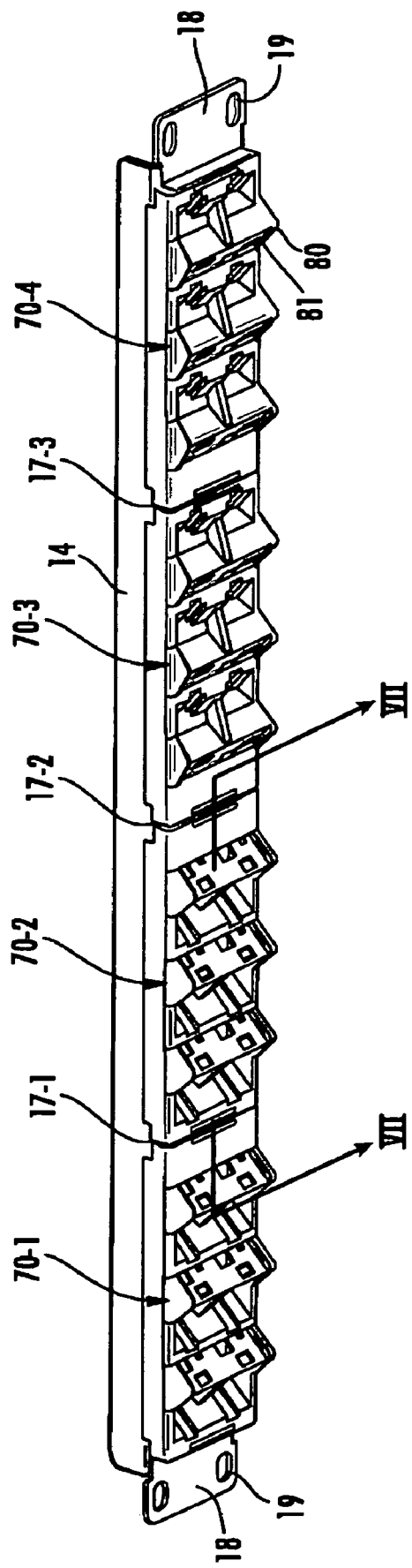
FIG. 6 is a perspective view similar to FIG. 1, illustrating four bezels mounted in the patch panel.

FIG. 6 illustrates four bezels 70-1, 70-2, 70-3, 70-4 connected to the patch panel 12 via the four openings 15-1, 15-2, 15-3, 15-4. The two rightmost bezels 70-3 and 70-4 have been connected to the patch panel 12 in the same orientation as illustrated in FIGS. 2, 3 and 4, such that the ports 76 face in a generally rightward direction in FIG. 6. The two leftmost bezels 70-1 and 70-2 have been rotated one hundred eighty degrees prior to connection to the patch panel 12, such that the ports 76 face in a generally leftward direction in FIG. 6.

Figure 7:
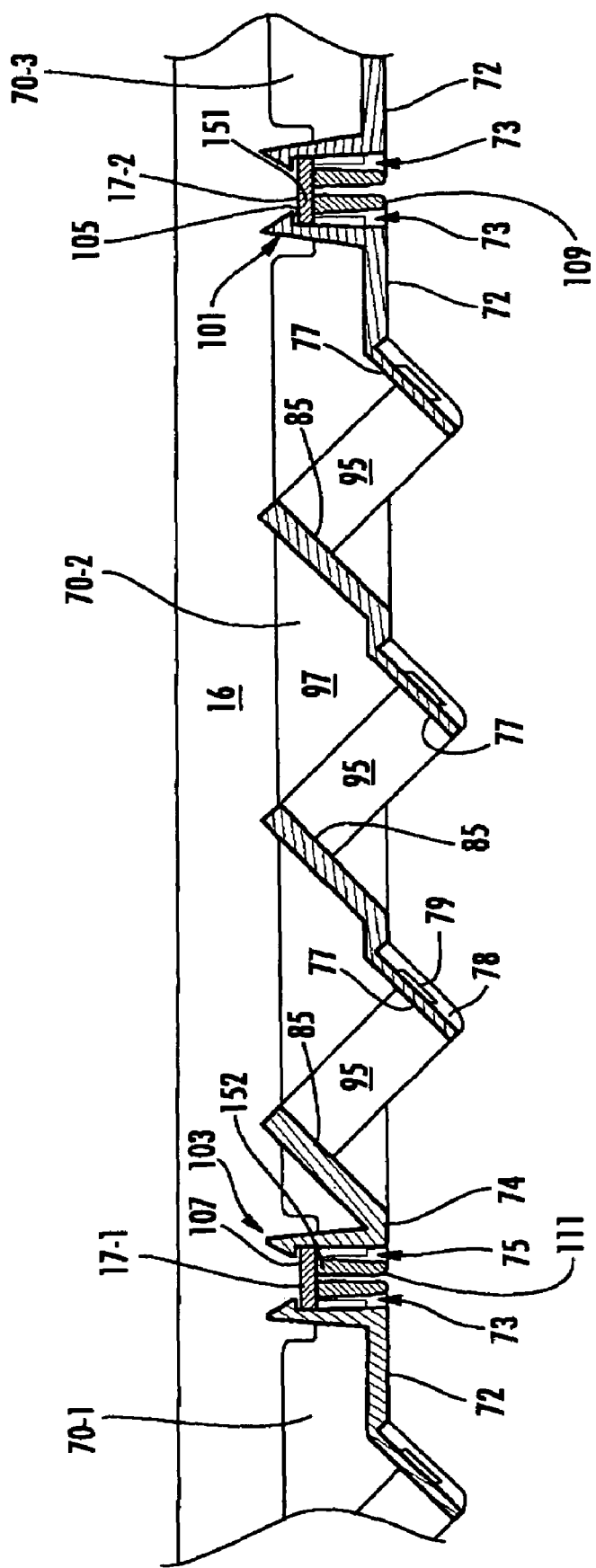
FIG. 7 is a cross sectional view taken along line VII-VII of FIG. 6.

FIG. 7 is a cross sectional view taken along line VII-VII in FIG. 6 and illustrates some of the connection feature cooperation between the bezels 70-1, 70-2, 70-3 and the patch panel 12. As illustrated on the right side of FIG. 7, the first snap lock 101 snaps beyond the notch 11 in the divider rib 17-2, which captures a side edge of the divider rib 17 between the third locking ridge 105 and the surface 151 of an end 109 (or first contact area) of the first flange 72. Likewise, the second snap lock 103 snaps beyond the notch 11 in the divider rib 17-1, which captures a side edge of the divider rib 17-1 between the fourth locking ridge 107 and the surface 152 of an end 111 (or second contact area) of the second flange 74.

Figure 8:
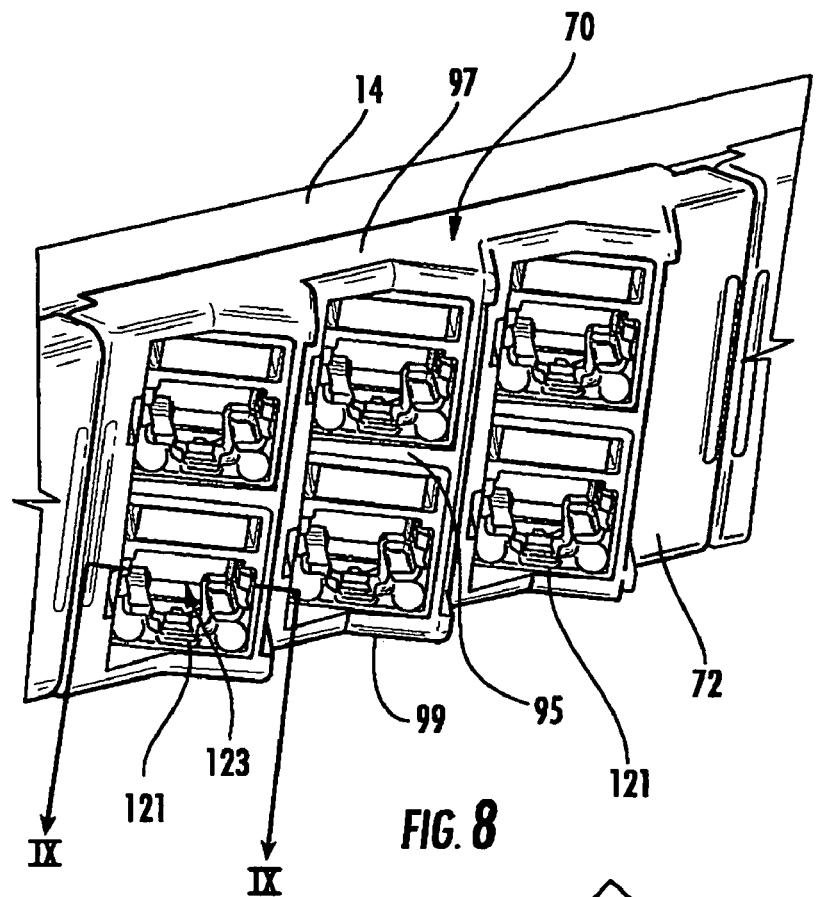
FIG. 8 is a close-up view showing a bezel loaded with six jack units, with the bezel mounted to the patch panel.

FIG. 8 is a close-up view showing a bezel 70 with six jack units mounted in the six ports 76, in particular six RJ-45 type jack units suitable for high-speed network connections. However, other types of jack units could be mounted in one or more of the ports 76 of more or more of the bezels 70. For example, the jack units could by adapted to receive a fiber optic connector, an F-type coaxial connector, an RCA-type connector, a BNC-type connector, etc.

As illustrated in FIG. 8, a plug latch recess 121 of each jack unit is position at the bottom of a plug aperture portion 133. This position for the plug latch recess 121 location (i.e. to the top or bottom of the plug aperture 123) has been widely accepted in the industry and is a desired location.

Figure 9:
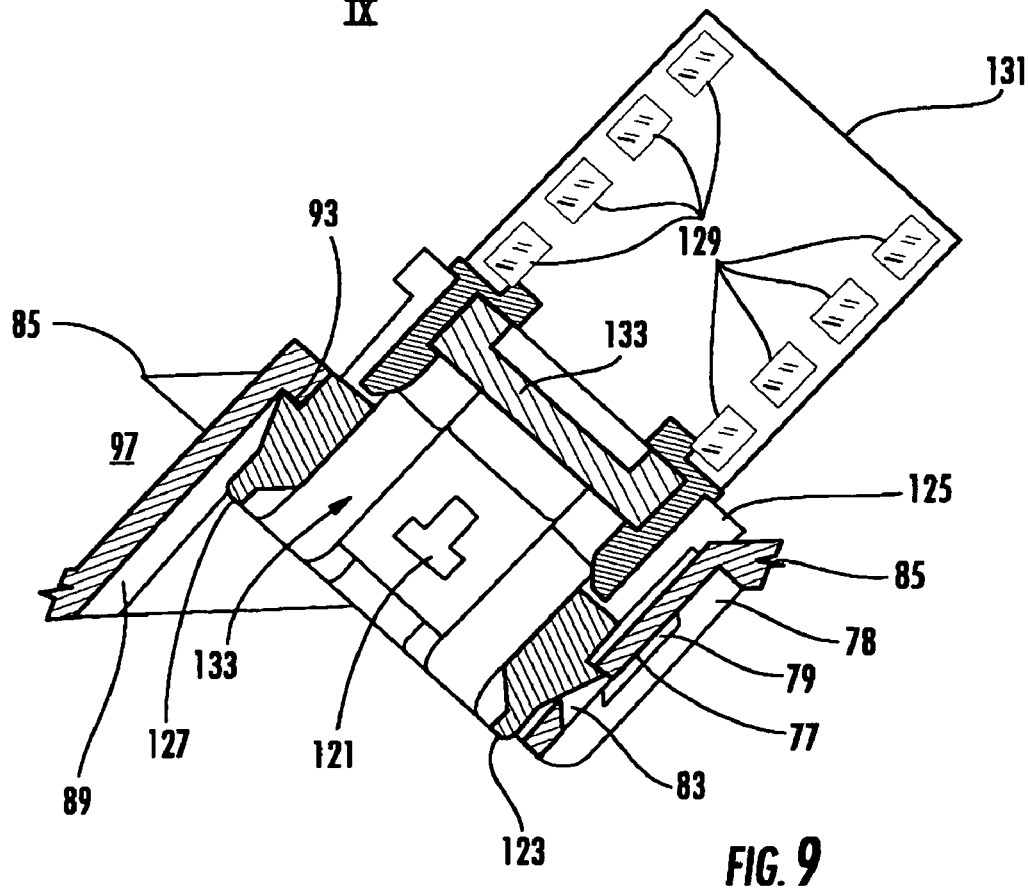
FIG. 9 is a cross sectional view taken along line IX-IX in FIG. 8, illustrating the snap in connection of the outlet to the bezel.

FIG. 9 is a cross sectional view taken along line IX-IX in FIG. 8. FIG. 9 illustrates a snap engagement of the RJ-type jack unit to the lateral side walls 77, 85 defining the port 76. The through cuts 83 and the first or second locking ridges 91 or 93 at the ends of channels 88 or 89 (illustrated in FIGS. 2-4) are arranged to accommodate resilient and fixed tabs on sidewalls of commercially available RJ-45 jack units, such as the series UNJ300, UNJ500 and UNJ600 jack units sold by CommScope.

As best seen in FIG. 9, a first resilient tab 123 on a sidewall of the jack unit is engaged within one of the through cuts 83 in the labeling surface 77. A first fixed tab 125 of the jack unit resides within another of the through cuts 83 in the labeling surface 77. Also, a second resilient tab 127 of the jack unit is engaged with the second locking ridge 93 of the second channel 89.

The engagements of the resilient and fixed tabs 123, 125, 127 on the sidewalls of the jack unit with the through cuts 83 and locking ridges 91 or 93 of the first or second channels 88 or 89 are sufficient to attach the jack unit into the port 76 of the bezel 70. A flat bladed tool may be inserted in the first or second channel 88 or 89 to bias the second resilient tab 127 out of engagement with the locking ridge 91 or 93 of the first or second channel 88 or 89. Therefore, the jack unit may be removed from the bezel 70 for service or replacement.

FIG. 9 also illustrates some of the internal structure of the jack unit, such as eight insulation displacement contacts 129 mounted within a housing 131, which housing 131 is itself snap-lock attached to the plug aperture portion 133 of the jack unit. An understanding of the mechanical structure or electrical structure of the jack unit, other than the external resilient and fixed tabs which cooperate with the bezel 70, is not necessary to the present invention. Therefore, no further details will be described.

Figure 10:
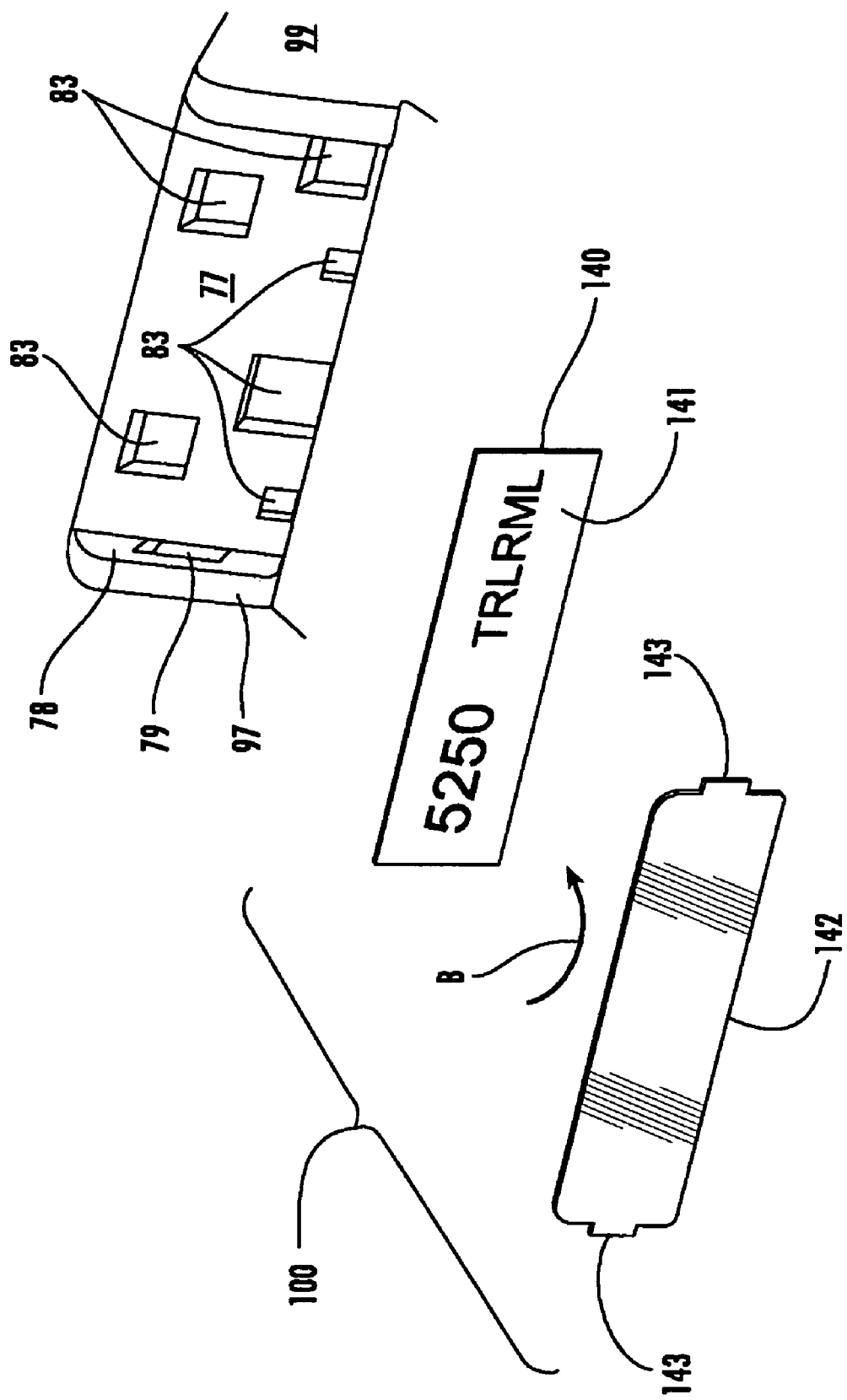
FIG. 10 illustrates a label system, in accordance with the present invention.

FIG. 10 illustrates a label system 100, in accordance with the present invention. The label system 100 includes a print medium 140 having printed indicia 141 thereon, such as a piece of paper or a card with handwritten or machine written codes thereon. The printed indicia 141 would be supplied by the end user and would be numbers or letters to indicate the equipment or room associate with the connections at the jack unit.

A transparent plastic cover 142 would be placed over the print medium 140 by the user. The transparent plastic portion 142 includes a protrusion 143 at each lateral end thereof. Further, the plastic portion 142 is flexible and may be slightly bowed, such as in the direction of arrow B.

In practice, the user would place the print medium 140 over the labeling surface 77, engage one of the protrusions 143 of the plastic portion 142 into one of the third or fourth through slots 79, 81, bow the plastic portion 142 and insert the other protrusion 143 into the other of the third and fourth through slots 79, 81. The natural resiliency of the plastic portion 142 would removably attach the label system 100 to the labeling surface 77. The label system 100 covers the through cuts 83 and the resilient and fixed tabs of the jack unit contained therein, which makes for a very clean and orderly appearance.

To remove the jack unit, the user would first remove the label system 100 to gain access to the through cuts 83. Then, a tool could be used to apply pressure to the first resilient tab 123 to snap it out of the through cut 83 while at the same time a thin flat bladed tool would be passed down the second channel 89 to bias the second resilient tab 127 past the second locking ridge 93.

In a preferred embodiment, the dimensions and relative positioning of the structural features of the bezel 70, as indicated in the drawing figures are particularly advantageous to a molding process for the bezel 70. Basically, all of the structural details are arranged such that a simple two dimensional molding process may form the bezel. In other words, only two mold pieces moving relative to each other along one direction (e.g. the direction defined as forward and rearward in the specification) can form the bezel 70. This is commonly referred to as a "straight pull" molding process. There is no need for a third mold piece (such as a cam or plunger) entering into the mold from a second direction.

Some of the structural features of the bezel 70 which enable the simple molding process are the alignment of the first and second through slots 73 and 75 with the third and fourth locking ridges 105 and 107, respectively, such that pieces of the mold pass through the first and second through slots 73 and 75 to form the third and fourth locking ridges 105 and 107, respectively. Another example can be found in the locating of the third and fourth through slots 79, 81 within the top and bottom shoulders 78, 80, respectively, where the third and fourth through slots 79, 81 open to, and are visible from, the bottom of the bezel 70.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A combination comprising:
    a patch panel formed by a frame having a plurality of openings placed laterally side-by-side therein and opposed lateral ends for mounting the patch panel to a rack system; and
    a bezel mounted in one of said plurality of openings of said patch panel, said bezel including:
        first and second contact areas engaging a portion of said patch panel and defining a general plane of said bezel;
        connection features attaching said bezel to said patch panel, wherein said connection features include at least one resilient snap lock to engage an edge of said one of said plurality of openings of said patch panel; and
        a plurality of ports, each port including opposed lateral walls with attachment features for mating with recesses or tabs formed on side walls of a jack unit so that the jack unit may be removably attached within the port, wherein each port opens in a direction which is set at an oblique angle relative to a normal line extending away from said general plane of said bezel at least slightly directed toward one of said opposed lateral ends of said patch panel.

2. The combination of claim 1, wherein said first and second contact areas abut an outer perimeter of said one of said plurality of openings holding said bezel.

3. The combination of claim 1, wherein said oblique angle is between about 30 degrees and 60 degrees.

4. The combination of claim 1, wherein said oblique angle is about 45 degrees.

5. The combination of claim 1, wherein said first and second contact areas are on lateral sides of said bezel.

6. The combination of claim 1, wherein said at least one resilient snap lock includes first and second resilient snap locks to engage opposed lateral edges of said one of said plurality of openings holding said bezel.

7. The combination of claim 1, wherein said bezel is formed of plastic.

8. The combination of claim 1, wherein said frame is formed of metal.

9. The combination of claim 1, wherein said plurality of ports are arranging in a matrix in said bezel, and wherein said matrix has at least two columns and two rows of ports.

10. The combination of claim 9, wherein said matrix includes three columns and two rows of ports.

11. The combination of claim 1, further comprising:
a first labeling surface formed on said bezel adjacent to a first port of said plurality of ports; and
a print medium to indicate a connection made in said first port overlying said first labeling surface.

12. The combination of claim 11, wherein said first labeling surface is bordered on two opposing sides by slots, and further comprising:
a flexible transparent plastic piece overlying said print medium and having opposed side edges engaged with said slots to retain said print medium on said first labeling surface.

13. The combination of claim 11, wherein said print medium overlying said first labeling surface also overlies said attachment features of a second and adjacent port of said plurality of ports.

14. A combination comprising:
a bezel configured for mounting to a patch panel, said bezel including:
first and second contact areas for engaging a portion of the patch panel and defining a general plane of said bezel;
connection features to attach said bezel to the patch panel, wherein said connection features include at least one resilient snap lock to engage an edge of an opening of the patch panel; and
a plurality of ports, each port including opposed lateral walls with attachment features for mating with recesses or tabs formed on side walls of a jack unit so that the jack unit may be removably attached within the port, wherein each port opens in a direction which is set at an oblique angle relative to a normal line extending away from said general plane of said bezel at least slightly directed toward a lateral side of said bezel.

15. The combination of claim 14, wherein said oblique angle is between about 30 degrees and 60 degrees.

16. The combination of claim 15, wherein said first and second contact areas are on lateral sides of said bezel and are adjacent to said connection features.

17. The combination of claim 15, wherein said plurality of ports are arranging in a matrix in said bezel, and wherein said matrix has at least two columns and two rows of ports.

18. The combination of claim 15, wherein said bezel is formed of molded plastic and the positioning of structural features of said bezel are arranged to permit straight pull molding to form said bezel.

19. The combination of claim 14, further comprising:
a first labeling surface formed on said bezel adjacent to a first port of said plurality of ports; and
a print medium to indicate a connection made in said first port overlying said first labeling surface.

20. The combination of claim 19, wherein said first labeling surface is bordered on two opposing sides by slots, and further comprising:
a flexible transparent plastic piece overlying said print medium and having opposed side edges engaged with said slots to retain said print medium on said first labeling surface.

21. The combination of claim 19, wherein said print medium overlying said first labeling surface also overlies said attachment features of a second and adjacent port of said plurality of ports.

22. A combination comprising:
a patch panel formed by a frame having a plurality of openings placed laterally side-by-side therein and opposed lateral ends for mounting the patch panel to a rack system; and
a bezel mounted in one of said plurality of openings of said patch panel, said bezel including:
first and second contact areas engaging a portion of said patch panel and defining a general plane of said bezel;
connection features attaching said bezel to said patch panel, wherein said connection features removably attach said bezel within one of said plurality of openings of said patch panel; and
a plurality of ports, each port including opposed lateral walls with attachment features for mating with recesses or tabs formed on side walls of a jack unit so that a jack unit may be removably attached within a port, wherein each port opens in a direction which is set at an oblique angle relative to a normal line extending away from said general plane of said bezel at least slightly directed toward one of said opposed lateral ends of said patch panel.

23. The combination of claim 22, further comprising:
a first labeling surface formed on said bezel adjacent to a first port of said plurality of ports; and
a print medium to indicate a connection made in said first port overlying said first labeling surface.

24. The combination of claim 23, wherein said print medium overlying said first labeling surface also overlies said attachment features of a second and adjacent port of said plurality of ports.

* * * * *